United States Patent
Liu

(10) Patent No.: US 10,746,024 B2
(45) Date of Patent: Aug. 18, 2020

(54) FAN NOISE-LOWERING STRUCTURE

(71) Applicant: ASIA VITAL COMPONENTS CO., LTD., New Taipei (TW)

(72) Inventor: Wen-Hao Liu, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 132 days.

(21) Appl. No.: 15/979,485

(22) Filed: May 15, 2018

(65) Prior Publication Data

US 2019/0353037 A1 Nov. 21, 2019

(51) Int. Cl.
*F01D 5/14* (2006.01)
*F01D 25/24* (2006.01)

(52) U.S. Cl.
CPC .............. *F01D 5/141* (2013.01); *F01D 25/24* (2013.01); *F05D 2260/96* (2013.01)

(58) Field of Classification Search
CPC .................. F01D 25/24; F04D 19/002; F04D 27/0207–0238; F04D 29/40; F04D 29/403; F04D 29/52; F04D 29/522; F04D 29/526; F04D 29/68; F04D 29/681; F04D 29/682; F04D 29/684; H02K 5/20
See application file for complete search history.

(56) References Cited

U.S. PATENT DOCUMENTS

| | | | |
|---|---|---|---|
| 6,179,562 B1 * | 1/2001 | Fujinaka | F04D 29/164 415/119 |
| 7,723,875 B2 * | 5/2010 | Fakes | H02K 5/20 310/58 |
| 8,230,910 B2 * | 7/2012 | Bielesch | F04D 19/002 165/121 |
| 8,936,433 B2 * | 1/2015 | Liu | F04D 25/0613 415/211.2 |

* cited by examiner

*Primary Examiner* — Igor Kershteyn
*Assistant Examiner* — Brian O Peters
(74) *Attorney, Agent, or Firm* — Jackson IPG PLLC; Demian K. Jackson

(57) ABSTRACT

A fan noise-lowering structure includes a fan frame main body and a connection section. The fan frame main body has a bottom side and a frame peripheral wall. The frame peripheral wall is perpendicularly annularly disposed on the outer rim of the bottom side. The inner rim of the frame peripheral wall defines an airflow passage. Two ends of the airflow passage respectively have an inlet and an outlet. The connection section is disposed in the frame peripheral wall. Two ends of the connection section are connected with the frame peripheral wall. The two ends of the middle passage are an inlet end and an outlet end in communication with the airflow passage. The connection section serves to guide the high-pressure air of the outlet to jet toward the inlet so as to achieve multiple noise-lowering effects.

8 Claims, 3 Drawing Sheets

FAN NOISE-LOWERING STRUCTURE

BACKGROUND OF THE INVENTION

1. Field of the Invention

The present invention relates generally to a fan noise-lowering structure, and more particularly to a fan noise-lowering structure, which is able to guide the high-pressure airflow generated at the outlet of the fan to jet toward the inlet so as to achieve multiple noise-lowering effects.

2. Description of the Related Art

Fan noise is always one of the problems to improve in the fan field. Conventionally, a circuit is used to control the rotational speed of the fan or the fan structure is changed so as to solve the fan noise problem. U.S. Pat. No. 6,244,817 discloses a conventional method for solving the fan noise problem, in which a jet is disposed on the dynamic blade or static blade frame wall to restrain vortex. However, it is necessary to additionally externally connect the fan to a jet source. This cannot be done in a limited space. Also, the additional jet source leads to increase of cost.

It is therefore tried by the applicant to provide a fan noise-lowering structure, which is able to lower the noise of the fan without increasing any equipment.

SUMMARY OF THE INVENTION

It is therefore a primary object of the present invention to provide a fan noise-lowering structure, in which a jet noise-lowering structure is disposed on the fan frame main body itself to solve the noise problem of the fan.

To achieve the above and other objects, the fan noise-lowering structure of the present invention includes a fan frame main body and a connection section.

The fan frame main body has a bottom side and a frame peripheral wall. The frame peripheral wall is perpendicularly annularly disposed on outer rim of the bottom side. The inner rim of the frame peripheral wall defines an airflow passage. Two ends of the airflow passage respectively have an inlet and an outlet.

The connection section is disposed in the frame peripheral wall. The connection section has a middle passage. Two ends of the middle passage are connected with the frame peripheral wall. The two ends of the middle passage are an inlet end and an outlet end in communication with the airflow passage.

Still to achieve the above and other objects, the fan noise-lowering structure of the present invention includes a first fan frame main body, a second fan frame main body and a connection section.

The first fan frame main body has a first bottom side and a first frame peripheral wall. The first frame peripheral wall is perpendicularly annularly disposed on outer rim of the first bottom side. An inner rim of the first frame peripheral wall defines a first airflow passage. Two ends of the first airflow passage respectively have a first inlet and a first outlet.

The second fan frame main body has a second bottom side and a second frame peripheral wall. The second frame peripheral wall is perpendicularly annularly disposed on outer rim of the second bottom side. An inner rim of the second frame peripheral wall defines a second airflow passage. Two ends of the second airflow passage respectively have a second inlet and a second outlet. The first and second fan frame main bodies are vertically connected in series or horizontally connected in parallel.

The connection section has a middle passage. The middle passage has an inlet end and an outlet end. The inlet end is in communication with the second outlet of the second frame peripheral wall. The outlet end is in communication with the first inlet of the first frame peripheral wall.

According to the above arrangement of the present invention, a jet structure is disposed on the fan frame main body itself to guide the higher-pressure airflow of the outlet of the fan to jet toward the inlet of the fan so that the noise of the entire fan is lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
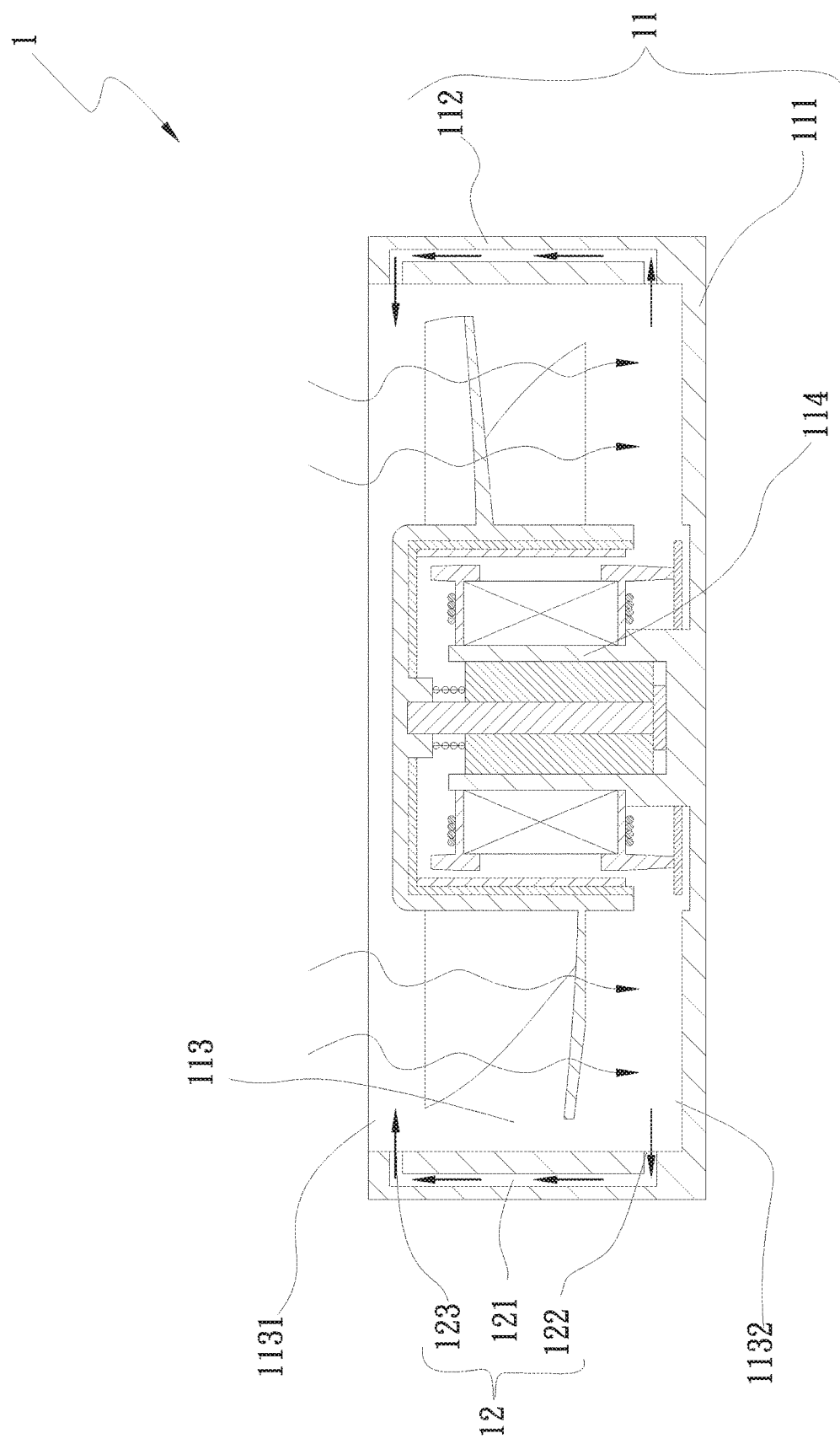
FIG. 1 is a sectional view of a first embodiment of the fan noise-lowering structure of the present invention.

Please refer to FIG. 1, which is a sectional view of a first embodiment of the fan noise-lowering structure of the present invention. According to the first embodiment, the fan noise-lowering structure 1 of the present invention includes a fan frame main body 11 and a connection section 12.

The fan frame main body 11 has a bottom side 111 and a frame peripheral wall 112. The frame peripheral wall 112 is perpendicularly annularly disposed on outer rim of the bottom side 111. The inner rim of the frame peripheral wall 112 defines an airflow passage 113. Two ends of the airflow passage 113 respectively have an inlet 1131 and an outlet 1132. The outlet 1132 of the airflow passage 113 is disposed in adjacency to the bottom side 111. The inlet 1131 is disposed at one end of the airflow passage 113 opposite to the outlet 1132.

The connection section 12 is disposed in the frame peripheral wall 112. The connection section 12 has a middle passage 121. Two ends of the middle passage 121 are connected with the frame peripheral wall 112. The two ends of the middle passage 121 are an inlet end 122 and an outlet end 123 in communication with the airflow passage 113. The inlet end 122 is positioned in adjacency to the outlet 1132. The outlet end 123 is positioned in adjacency to the inlet 1131.

The bottom side 111 has a bearing cup 114 perpendicularly extending from the bottom side 111.

Figure 2:
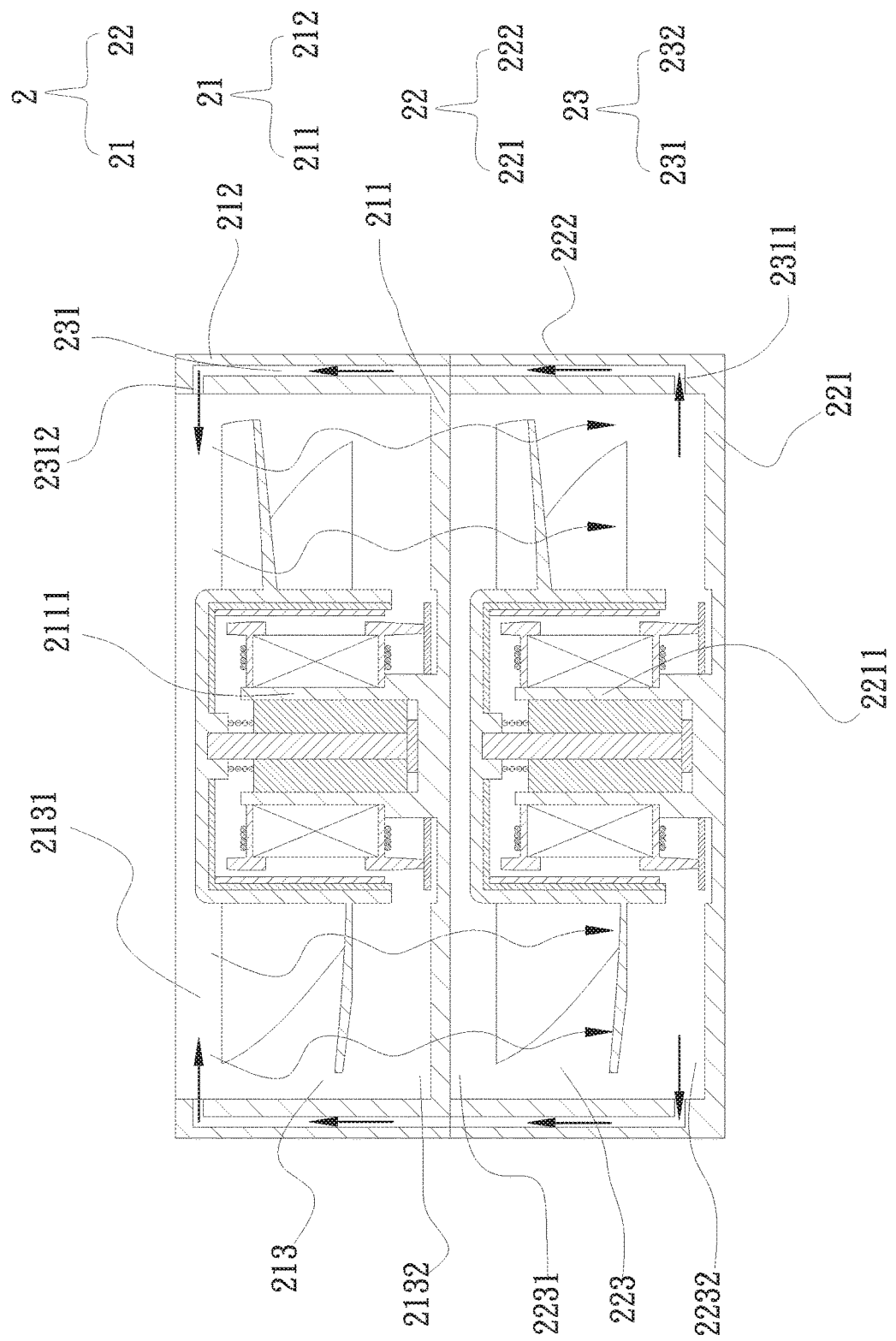
FIG. 2 is a sectional view of a second embodiment of the fan noise-lowering structure of the present invention.

Please now refer to FIG. 2, which is a sectional view of a second embodiment of the fan noise-lowering structure of the present invention. According to the second embodiment, the fan noise-lowering structure 2 of the present invention includes a first fan frame main body 21, a second fan frame main body 22 and a connection section 23.

The first fan frame main body 21 has a first bottom side 211 and a first frame peripheral wall 212. The first frame peripheral wall 212 is perpendicularly annularly disposed on outer rim of the first bottom side 211. The inner rim of the first frame peripheral wall 212 defines a first airflow passage 213. Two ends of the first airflow passage 213 respectively have a first inlet 2131 and a first outlet 2132.

The second fan frame main body 22 has a second bottom side 221 and a second frame peripheral wall 222. The second frame peripheral wall 222 is perpendicularly annularly disposed on outer rim of the second bottom side 221. The inner rim of the second frame peripheral wall 222 defines a second airflow passage 223. Two ends of the second airflow passage 223 respectively have a second inlet 2231 and a second outlet 2232. The first and second fan frame main bodies 21, 22 are selectively vertically connected in series or horizontally connected in parallel. In this embodiment, the first and second fan frame main bodies 21, 22 are, but not limited to, vertically connected in series to form a series fan for illustration purposes. The first outlet 2132 is mated with the second inlet 2231.

The connection section 23 has a middle passage 231. The middle passage 231 has an inlet end 2311 and an outlet end 2312. The inlet end 2311 is in communication with the second outlet 2232 of the second frame peripheral wall 222. The outlet end 2312 is in communication with the first inlet 2131 of the first frame peripheral wall 212.

The middle passage 231 of the connection section 23 serves to guide the higher-pressure airflow of the second outlet 2232 of the second fan frame main body 22 to jet toward the first inlet 2131 of the first fan frame main body 21 so as to lower the noise.

The first bottom side 211 has a first bearing cup 2111 perpendicularly extending from the first bottom side 211. The second bottom side 221 has a second bearing cup 2211 perpendicularly extending from the second bottom side 221.

The first outlet 2132 of the first airflow passage 213 is disposed in adjacency to the first bottom side 211. The first inlet 2131 is disposed at one end of the first airflow passage 213 opposite to the first outlet 2132. The inlet end 2311 is positioned in adjacency to the second outlet 2232. The outlet end 2312 is positioned in adjacency to the first inlet 2131.

The second outlet 2232 of the second airflow passage 223 is disposed in adjacency to the second bottom side 221. The second inlet 2231 is disposed at one end of the second airflow passage 223 opposite to the second outlet 2232.

Figure 3:
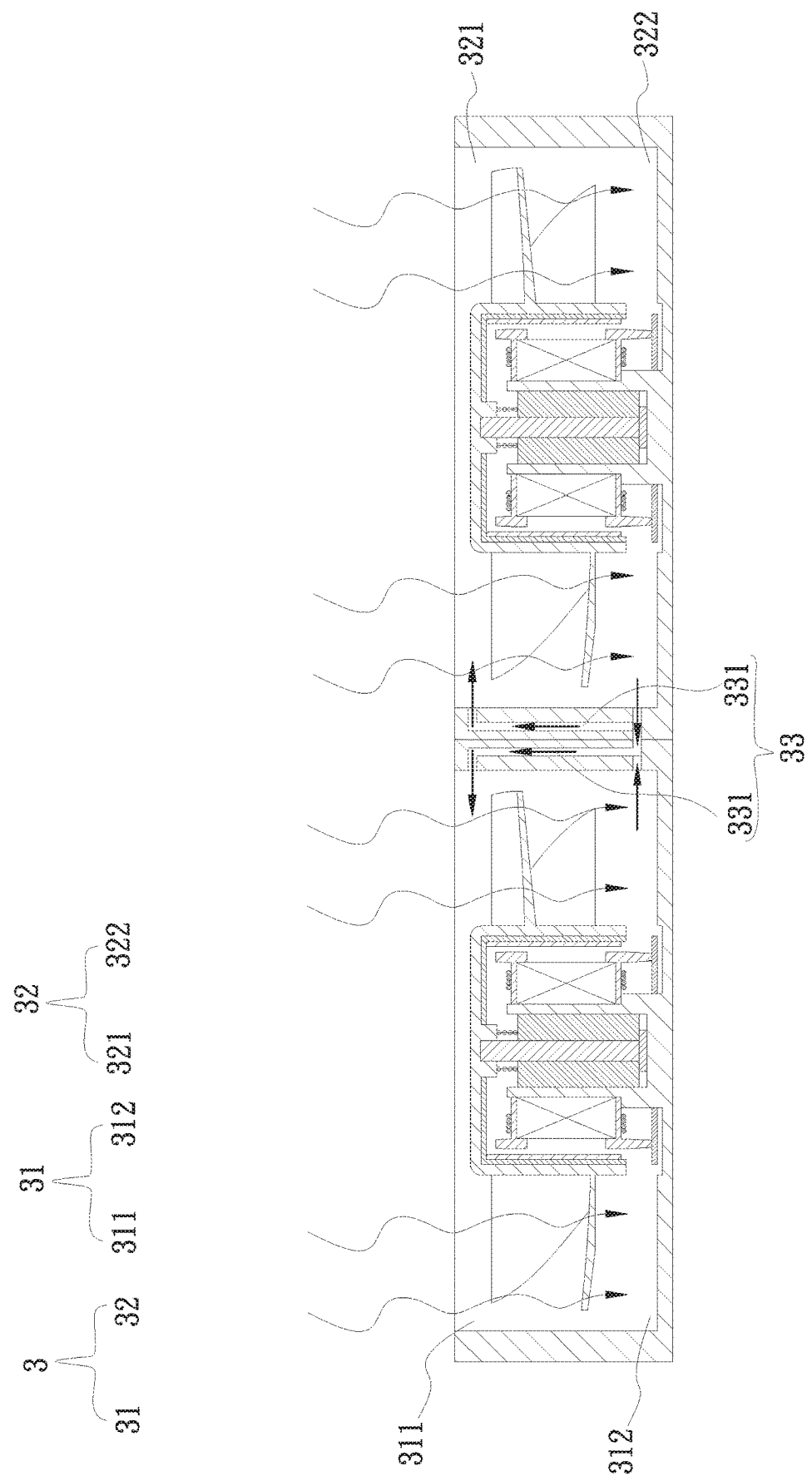
FIG. 3 is a sectional view of a third embodiment of the fan noise-lowering structure of the present invention.

Please now refer to FIG. 3, which is a sectional view of a third embodiment of the fan noise-lowering structure of the present invention. According to the third embodiment, the fan noise-lowering structure 3 of the present invention includes a first fan frame main body 31, a second fan frame main body 32 and a connection section 33.

The third embodiment is partially identical to the second embodiment in structure and thus will not be redundantly described hereinafter. The third embodiment is different from the second embodiment in that the first and second fan frame main bodies 31, 32 are horizontally arranged in parallel to form a parallel fan. The first fan frame main body 31 has a first inlet 311 and a first outlet 312. The second fan frame main body 32 has a second inlet 321 and a second outlet 322. The first and second inlets 311, 321 are arranged in parallel. The middle passage 331 of the connection section 33 serves to guide the higher-pressure airflow of the second outlet 322 of the second fan frame main body 32 to jet toward the first inlet 311 of the first fan frame main body 31 so as to lower the noise.

According to the above arrangement of the present invention, the airflow of the high-pressure position (outlet position) of the fan itself jets toward the low-pressure position (inlet position) so as to lower the noise problem of the fan.

The connection section can be disposed in the wall of the fan frame itself or disposed on the fan frame in a plug-in manner. This is not limited.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A fan noise-lowering structure comprising:
   a fan frame main body having a bottom side and a frame peripheral wall, the frame peripheral wall being perpendicularly annularly disposed on outer rim of the bottom side, an inner rim of the frame peripheral wall defining an airflow passage, two ends of the airflow passage respectively having an inlet and an outlet; and
   a connection section disposed within the frame peripheral wall, the connection section having a middle passage, two ends of the middle passage being connected with the frame peripheral wall, the two ends of the middle passage being an inlet end and an outlet end in communication with the airflow passage.

2. The fan noise-lowering structure as claimed in claim 1, wherein the bottom side has a bearing cup perpendicularly extending from the bottom side.

3. The fan noise-lowering structure as claimed in claim 1, wherein the outlet of the airflow passage is disposed in adjacency to the bottom side, while the inlet is disposed at one end of the airflow passage opposite to the outlet, the inlet end being positioned in adjacency to the outlet, the outlet end being positioned in adjacency to the inlet.

4. A fan noise-lowering structure comprising:
   a first fan frame main body having a first bottom side and a first frame peripheral wall, the first frame peripheral wall being perpendicularly annularly disposed on outer rim of the first bottom side, an inner rim of the first frame peripheral wall defining a first airflow passage, two ends of the first airflow passage respectively having a first inlet and a first outlet;
   a second fan frame main body having a second bottom side and a second frame peripheral wall, the second frame peripheral wall being perpendicularly annularly disposed on outer rim of the second bottom side, an inner rim of the second frame peripheral wall defining a second airflow passage, two ends of the second airflow passage respectively having a second inlet and a second outlet, the first and second fan frame main bodies being vertically connected in series or horizontally connected in parallel; and
   a connection section having a middle passage, the middle passage having an inlet end and an outlet end, the inlet end being in communication with the second outlet of the second frame peripheral wall, the outlet end being in communication with the first inlet of the first frame peripheral wall.

5. The fan noise-lowering structure as claimed in claim 4, wherein the first bottom side has a first bearing cup perpendicularly extending from the first bottom side and the second bottom side has a second bearing cup perpendicularly extending from the second bottom side.

6. The fan noise-lowering structure as claimed in claim 4, wherein the first outlet of the first airflow passage is disposed in adjacency to the first bottom side, while the first inlet is disposed at one end of the first airflow passage opposite to the first outlet, the inlet end being positioned in adjacency to the second outlet, the outlet end being positioned in adjacency to the first inlet, the second outlet of the second airflow passage being disposed in adjacency to the second bottom side, while the second inlet being disposed at one end of the second airflow passage opposite to the second outlet.

7. The fan noise-lowering structure as claimed in claim 4, wherein the first and second fan frame main bodies are vertically arranged in series and mated with each other with the first outlet mated with the second inlet.

8. The fan noise-lowering structure as claimed in claim 4, wherein the first and second fan frame main bodies are horizontally arranged in parallel with the first and second inlets arranged in parallel.

* * * * *